United States Patent [19]

Chiang-Piao et al.

[11] Patent Number: 4,896,051
[45] Date of Patent: Jan. 23, 1990

[54] MULTI-PURPOSE SENSE CONTROLLER

[76] Inventors: Line Chiang-Piao, 4F., No. 330, Sec. 4, Chung Yang N. Rd., Pei Tou District Taipei; Tsai Wen-Pin, 3F., No. 4, Lane 9, Ning an Street, Taipei, both of Taiwan

[21] Appl. No.: 192,150

[22] Filed: May 10, 1988

[51] Int. Cl.$^4$ ............................................. H01H 35/00
[52] U.S. Cl. ................................... 307/117; 307/116; 73/780; 324/658; 324/663; 324/678
[58] Field of Search ............. 307/116, 117; 324/60 R, 324/60 C, 60 CD, 61 R, 61 P, 61 QS, 61 QL, 65 R, 65 CR, 65 CP, 65 P; 340/562, 563, 564; 73/780

*Primary Examiner*—William M. Shoop, Jr.
*Assistant Examiner*—Paul Ip

[57] ABSTRACT

This invention relates to a multi-purpose sense controller and in particular to one including a system frequency generator producing a steady frequency for timing and synchronism, a capacity detecting system including a capacity decreasing detector and a zero capacity balance detector for detecting and determining input capacity change and serving out corresponding signals, a mode control input for setting the selected mode and controlling time period, a timing controller for calculating time, a comparator memory for compartively determining the variation of the induced condition so as to send out signal to actuate the controller, a timing output controller for providing timing switch, delay switch, and delay timing switch through the selection of the mode controller, a sense output controller which will determine the output condition through the selection of the mode controller, a switch output controller controlled by the selection of the controller so that it will be actuated by a first sense and stopped by a second sense, and a conducting plate connected to the input of the controller.

1 Claim, 1 Drawing Sheet

MULTI-PURPOSE SENSE CONTROLLER

This invention relates to a multi-purpose sense controller.

It is the primary object of the present invention to provide a multi-purpose sense controller which utilizes a set of input controllers to achieve multi-purpose controller output.

It is another object of the present invention to provide a multi-purpose sense controller which can send out different outputs by means of the multi-purpose controlling mode of a sense controller.

It is still another object of the present invention to provide a multi-purpose sense controller which may be applied to electronic control for toys, automatic control for faucets and driers, or the like.

It is still another object of the present invention to provide a multi-purpose sense controller which is simple in construction.

It is a further object of the present invention to provide a multi-purpose sense controlle which is economic to produce.

Other objects and merits and a fuller understanding of the present invention will be obtained when the following detailed description is read in conjunction with the accompanying drawings wherein like numerals refer to similar or like parts and in which.

Figure 1:
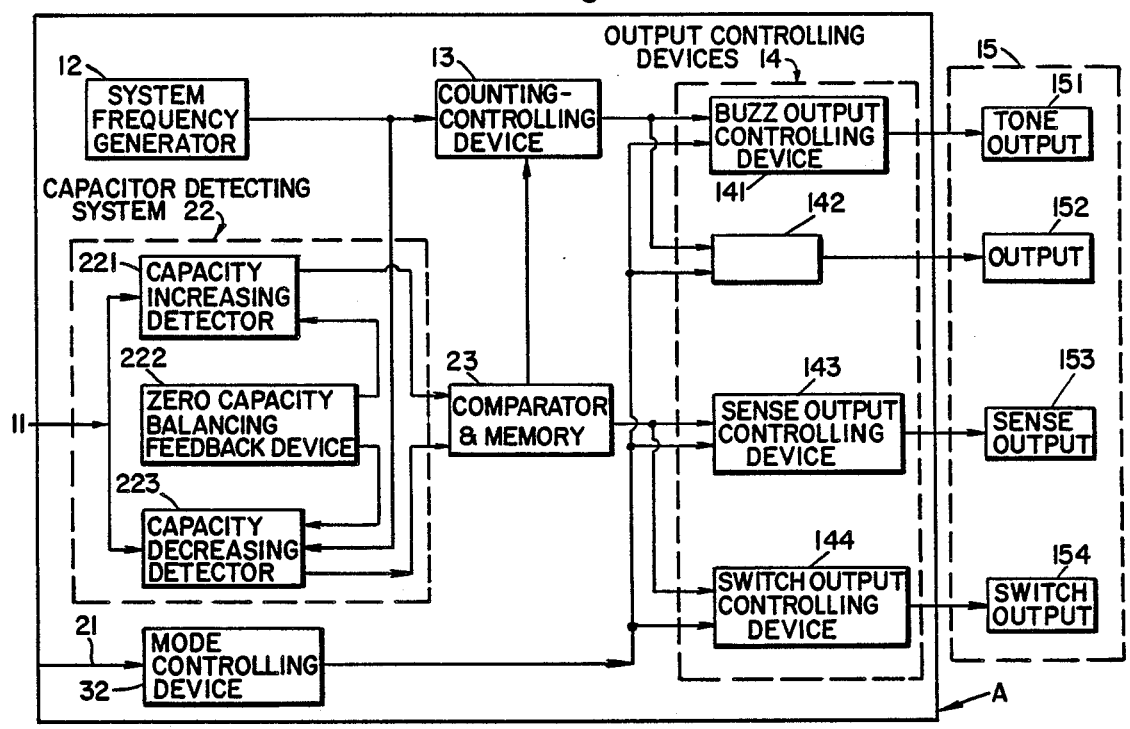
FIG. 1 is a flow chart of the present invention.

For purposes of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to FIG. 1, the multi-purpose sense controller according to the present invention comprises a sense input 11, a mode control input 21 and a group of output 15 which are acted as a interface. The mode is determined by the mode control input 21 and it can sense the variation of the human body capacity via the sense input 11 which eventually actuates the output 15. The present invention mainly comprises the following component parts:

A system frequency generator 12 for producing oscillating frequency and synchronous signals;

A capacitor detecting system 22 including a capacity increasing detector 221, a capacity decreasing detector 223, a zero capacity balancing feedback device 222 for detecting the capacity variation of the human body from the sense input 11 so as to detect whether there is sensing condition or not;

A mode controlling device 32 for selecting desired output controlling device by means of the setting of the mode controlling input 21;

A comparator and memory 23 utilizing the comparation of the variation condition transmitted by the capacity detecting system 22 so as to send out counting and controling signals;

A set of output controlling device 14 and corresponding outputs 15 including a buzz output controlling device 141 and its output 151 for generating various tones according to the sensing or output condition by adapting to the controlling mode;

A sense output controlling device 143 and its output 153 actuable even by very small sense, the actuation being kept when the sense is kept and being turned off in case of no sense;

A switch output controlling device 144 and its output 154 actuable by absorbing very small capacity sense and stopped by another sense input.

The principle of the component parts is described as follows:

The system frequency generator 12 produces steady frequency to the counting controlling device 13 and the capacity detecting system 22 so as to detect whether there is capacitor variation, counting pulses and the synchronous use of other controlling device. The sense input 11 will transmit the capacitor variation to the capacitor detecting system 22 in order to judge the sensing condition. In association with controlling mode set by the mode controlling input 21. the output controlling set 14 and the timing period are selected via the mode controlling device 32. The output controlling set 14 actually sends out a set of corresponding controlling output 15 for controlling the devices. That is, the present invention is characterized in a controller A which will produce a multi-purpose controlling mode and multiple inputs by means the selection of a set of mode controlling input 2 and a single sense input 11 of a set of controlling output 15.

Figure 2:
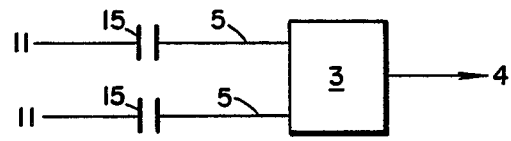
FIG. 2 is a circuit diagram for the sense input of the present invention.
Figure 3:
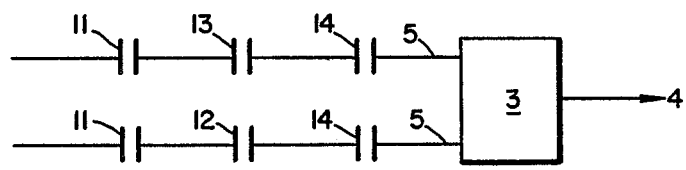
FIG. 3 is another embodiment of FIG. 2.
Figure 4:
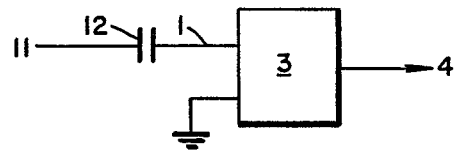
FIG. 4 is a circuit diagram for a prior art capacity touch sensor.

With reference to FIG. 2, there is shown the circuit of the sense input 11. As illustrated, the sense input 11 has two sensing capacitors 15 with a conducting plate 5 connected to one electrode thereof. By means of the area of the conducting plate 5, a capacitor 15 will be formed between the human body and the conducting plates. For example, in case of placing in a fruit basket, the conducting plate will directly or indirectly get in touch wih the fruit thereby forming a sensing area around the fruit. Hence, when the fruit is taken up by the hand, a capaity variation will be produced thus turning on the switch and therefore, controlling the music or speech.

The two poles (main induction pole and ground induction pole) of the capacitor are connected with a conducting plate which may cause the capacitor to produce an inductance to actuate the output. Conclusively, one sensing controller with more than one sensing imputs is sufficient and the electrical circuit is unnecessary to change.

Although this invention has been described with a certain degree of particularity, it is understood that the present disclosure is made by way of example only and that numerous changes in the construction and the combination and arrangement of parts may be resorted to without departing from the spirit and scope of the invention as hereinafter claimed.

I claim:

1. A multi-purpose sense controller comprising:
   a system frequency generator producing a steady frequency for timing and synchronism;
   a capacity detecting system including a capacity decreasing detector and a zero capacity balance detector for detecting and determining input capacity change and sending out corresponding signals;

a mode control input for setting the selected mode and controlling time period;

a timing controller for calculating time;

a comparator memory for comparatively determining the variation of the induced condition so as to send out signal to actuate the controller;

a timing output controller for providing timing switch, delay switch, and delay timing switch through the selection of the mode controller;

a sense output controller which all determine the output condition through the selection of the mode controller;

a switch output controller controlled by the selection of the controller so that it will be actuated by a first sense and stopped by a second sense; and a conducting plate connected to the input of the controller.

* * * * *